United States Patent [19]

Tsukazaki

[11] Patent Number: 5,172,728
[45] Date of Patent: Dec. 22, 1992

[54] THREE-WAY-VALVE

[75] Inventor: Hideo Tsukazaki, Tokyo, Japan

[73] Assignee: T.H.I. System Corporation, Tokyo, Japan

[21] Appl. No.: 788,938

[22] Filed: Nov. 7, 1991

[30] Foreign Application Priority Data

Nov. 8, 1990 [JP] Japan .................................. 2-303410
Oct. 29, 1991 [JP] Japan .................................. 3-309993

[51] Int. Cl.⁵ ............................................ F16K 11/00
[52] U.S. Cl. ................................ 137/637.2; 137/240; 137/606; 251/331
[58] Field of Search ..................... 137/240, 606, 637.2; 251/331

[56] References Cited

U.S. PATENT DOCUMENTS

| | | | |
|---|---|---|---|
| 3,080,887 | 3/1963 | Brandenberg | 137/596.14 |
| 3,884,259 | 5/1975 | Hosmer et al. | 137/637.2 X |
| 4,744,388 | 5/1988 | Ariizumi et al. | 137/596.18 X |
| 4,794,951 | 1/1989 | Ryzner | 137/596.18 X |
| 4,860,794 | 8/1989 | Parrott et al. | 137/637.2 |

Primary Examiner—Gerald A. Michalsky
Attorney, Agent, or Firm—Kanesaka & Takeuchi

[57] ABSTRACT

A three-way valve includes a cylindrical auxiliary valve shaft (12); a main valve shaft (11) provided within the cylindrical shaft; a cylindrical auxiliary valve plug (10) provided on a tip of the auxiliary valve shaft; a main valve plug (9) provided on a tip of the main valve shaft; a valve body (6); a first port (3) formed in the valve body in a direction of traveling of the main valve shaft; a main valve seat (1) formed around the first port for receiving the main valve plug, the main valve seat and the main valve plug constituting a main valve; an annular auxiliary valve seat (2) for receiving the auxiliary valve plug, the auxiliary valve seat and the auxiliary valve plug constituting an auxiliary valve; a common passage (13) formed between a contact area of the main valve plug with the main valve seat and a contact area of the auxiliary valve plug with the auxiliary seat; a second port (4) formed in the valve body for communicating with the first port via the common passage; a passage (14) formed outside the auxiliary valve seat; and a third port (5) formed in the valve body for communicating with the passage and the second port via the auxiliary valve and the common passage.

9 Claims, 10 Drawing Sheets

THREE-WAY-VALVE

BACKGROUND OF THE INVENTION

1. Field of the Invention

The present invention relates to three-way valves useful for semiconductor production equipment, food processing machines, etc. which must be very clean.

2 Description of the Prior Art

It is frequent to clean the piping of semiconductor production equipment, biotechnological and food processing machines, etc. with an inert gas, such as a nitrogen gas, water, or steam, in order to assure the clean piping.

FIG. 8 shows a conventional piping in which two two-way valves 15a and 16a are installed in the downstream portions of a pipe 15 for semiconductor production equipment, for example, and a pipe 16 for carrying a cleaning fluid to the pipe 15. A primary fluid and a cleaning fluid enter at inlets 15A and 16A, respectively, and exit from an outlet 17A as indicated by solid arrows.

However, in the above arrangement there is a residence space S between the two-way valve 15a and a connection fitting 17, making it difficult to clean the area. The same is true in cleaning the upstream portions of the pipes as indicated by broken arrows. Thus, it is necessary to install the two-way valves 15a and 16a as close as possible.

In FIGS. 9 and 10, in order to minimize the residence space, it has been proposed that two two-way valves 18A and 18B are integrated to eliminate the connection fitting. A primary fluid and a cleaning fluid enter at inlets 19 and 20 and exit from an outlet 21.

However, there is still a residence space although it is reduced. The cleaning time of this arrangement is much shorter than that of FIG. 8, but there is room to be improved.

In order to solve such problems, the use of three-way valves has been proposed such as a ball valve of FIG. 11 and a slide valve of FIG. 12. There seem no residence spaces in these valves. However, it is necessary to provide some gaps between sliding parts 22 and 23 and opposed walls 24 and 25, resulting in the creation of residence spaces. The volume of these spaces is much smaller than that of the case where two-way valves are used but, upon cleaning, there can be backflows of a fluid remaining in the gap, thus presenting a serious problem.

SUMMARY OF THE INVENTION

Accordingly, it is an object of the invention to provide a three-way valve capable of reducing the cleaning time and improving the cleanness.

According to the invention there is provided a three-way valve which includes a cylindrical auxiliary valve shaft; a main valve shaft provided within the cylindrical shaft; a cylindrical auxiliary valve plug provided on a tip of the auxiliary valve shaft; a main valve plug provided on a tip of the main valve shaft; a valve body; a first port formed in the valve body in a direction of traveling of the main valve shaft; a main valve seat formed around the first port for receiving the main valve plug, the main valve seat and the main valve plug constituting a main valve; an annular auxiliary valve seat for receiving the auxiliary valve plug, the auxiliary valve seat and the auxiliary valve plug constituting an auxiliary valve; a common passage formed between a contact area of the main valve plug with the main valve seat and a contact area of the auxiliary valve plug with the auxiliary valve seat; a second port formed in the valve body for communicating with the first port via the common passage; a passage formed outside the auxiliary valve seat; and a third port formed in the valve body for communicating with the passage and the second port via the auxiliary valve and the common passage.

The above and other objects, features, and advantages of the invention will become more apparent from the following description when taken in conjunction with the accompanying drawings.

DESCRIPTION OF THE PREFERRED EMBODIMENT

Figure 1:
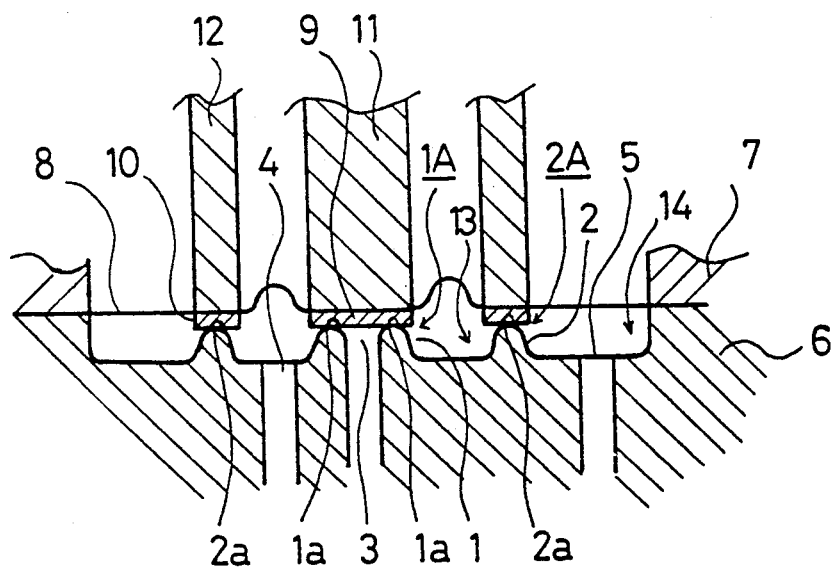
FIG. 1 is a sectional view of a three-way valve according to an embodiment of the invention.
Figure 2:
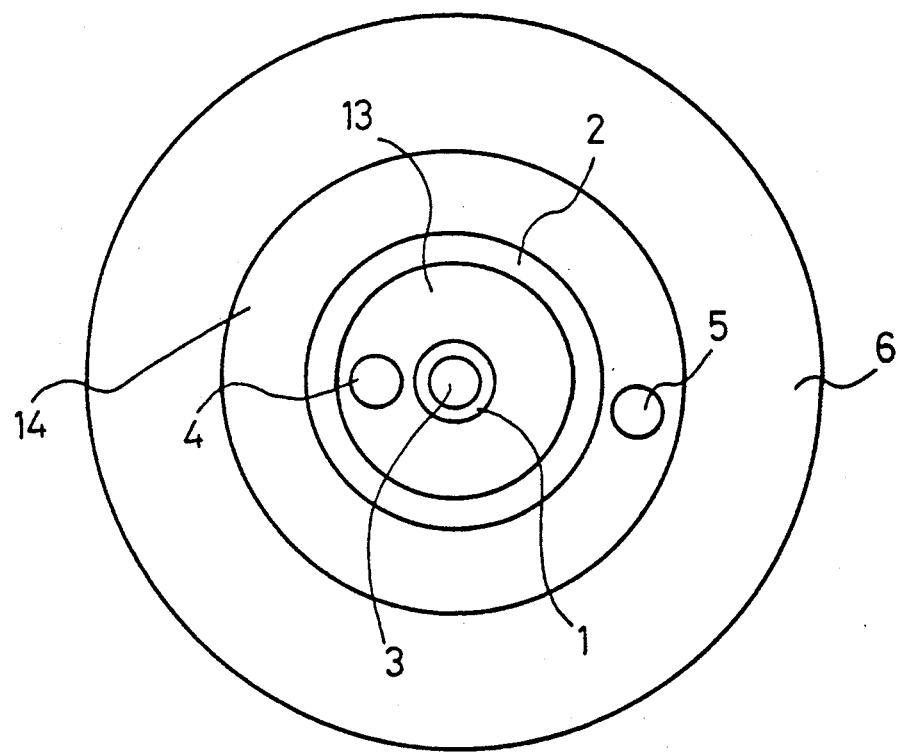
FIG. 2 is a plan view of a valve seat of the three-way valve.
Figure 3:
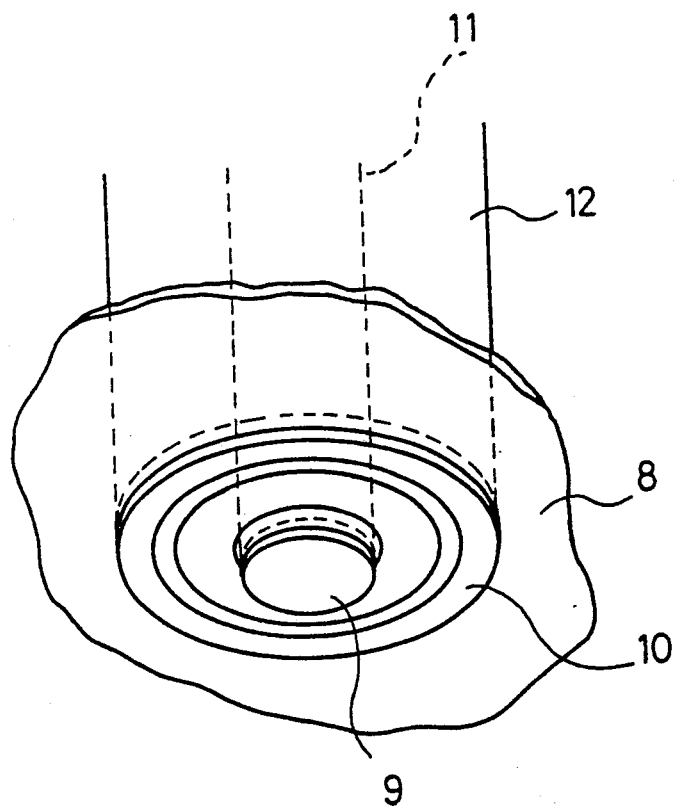
FIG. 3 is a perspective view of a valve body of the three-way valve.

In FIGS. 1–3, annular main and auxiliary valve seats 1 and 2, and a primary fluid inlet 3, an outlet 4, and a cleaning fluid inlet 5 are formed in a valve body 6. A circular main valve plug 9 and an annular auxiliary valve plug 10 are joined with circular and annular thrust shafts 11 and 12, respectively, via a sealing diaphragm 8 which is made from an elastic or metal film. The diaphragm 8 is placed between the valve body 6 and a bonnet 7 to make a fluid-tight seal. The upper ends of the thrust shafts 11 and 12 are connected to thrust sources such as thread manual handles or hydraulic cylinders (not shown) to move the main and auxiliary valve plugs 9 and 10. The main valve plug 9 and the main valve seat 1 constitute a main valve 1A and the auxiliary valve plug 10 and the valve seat 2 constitute an auxiliary valve 2A.

More specifically, the inlet 3 for a primary fluid is formed in the valve body 6, and the primary valve seat 1 is raised around the inlet 3. The auxiliary valve seat 2 is raised concentrically with the main valve seat 1. An annular space or common passage 13 is defined between a contact area 1a of the main valve plug 9 with the main valve seat 1 and a contact area 2a of the auxiliary valve plug 10 with the auxiliary valve seat 2. The first and second thrust shafts 11 and 12 are provided above the main and auxiliary valve seats 1 and 2, respectively. The main and auxiliary valve plugs 9 and 10 are provided on the tips of the thrust shafts 11 and 12 via the diaphragm 8. Another annular space or passage 14 is formed outside the auxiliary valve seat 2. The cleaning fluid inlet 5 is formed in the annular space 14 while the fluid outlet 4 is formed on the annular space 13.

In operation, normally, the auxiliary valve plug 10 is urged against the auxiliary valve seat 2 under the thrust to close the auxiliary valve 2A so that by opening the main valve 1A it is possible to direct a primary fluid from the inlet 3 to the outlet 4 via the main valve 1A and the annular space 13. Under this condition, the main valve 1A functions as a two-way valve to control the flow of a primary fluid.

To perform cleaning, the main valve 1A is closed while the auxiliary valve 2A is opened so that a cleaning fluid flows from the inlet 5 to the outlet 4 via the annular space 14, the auxiliary valve 2A, and the annular space 13 to clean the inside of the three-way valve, such as the annular space 13 and outlet 4, and the piping on the secondary side.

Also, it is possible to clean the piping on the primary side by taking the outlet 4, and the inlets 3 and 5 as an inlet, an outlet, and an inlet for a cleaning fluid, respectively.

In the above arrangement, the annular space 13 serves as a passage for both primary and cleaning fluids, thereby eliminating any residence space, thus resulting in the reduced cleaning time and the increased cleanness level. Also, it is possible to reduce the valve volume, resulting in the reduced installation area.

By interlocking the thrust sources for the two thrust shafts 11 and 12 to always close the main valve 1A when the auxiliary valve 2A is opened it is possible to prevent the primary fluid from mixing with the cleaning fluid by accident.

It is possible to automate the operation of the auxiliary valve 2A by installing a compression spring on the auxiliary valve thrust shaft 12 to open the auxiliary valve 2A if the pressure of a cleaning fluid on the diaphragm 8 outside the auxiliary valve 2A exceeds the spring force.

Figure 4:
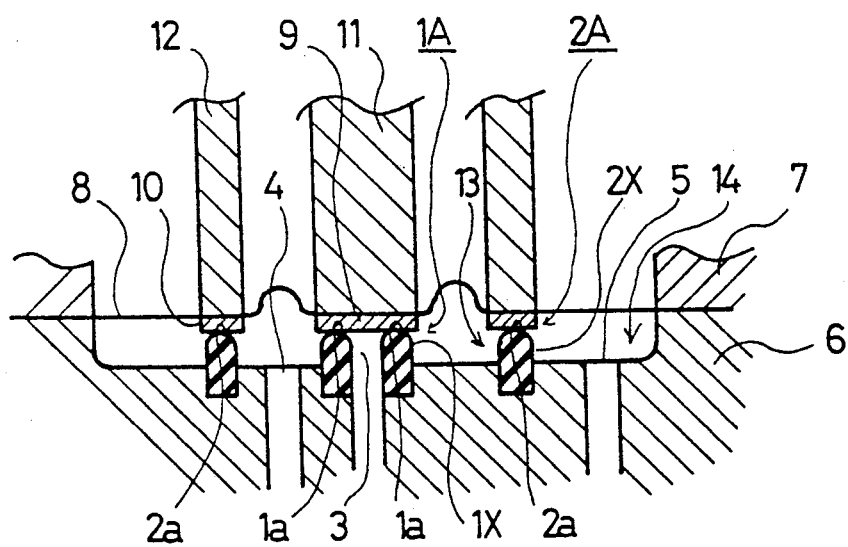
FIG. 4 is a sectional view of a three-way valve according to another embodiment of the invention.

In FIG. 4, main and auxiliary valve seats 1X and 2X are made from a elastic material so as to increase the fluid-tight properties. Alternatively, the tips of the thrust shafts 11 and 12 may be formed as valve plugs, providing a double piston valve structure.

Figure 5:
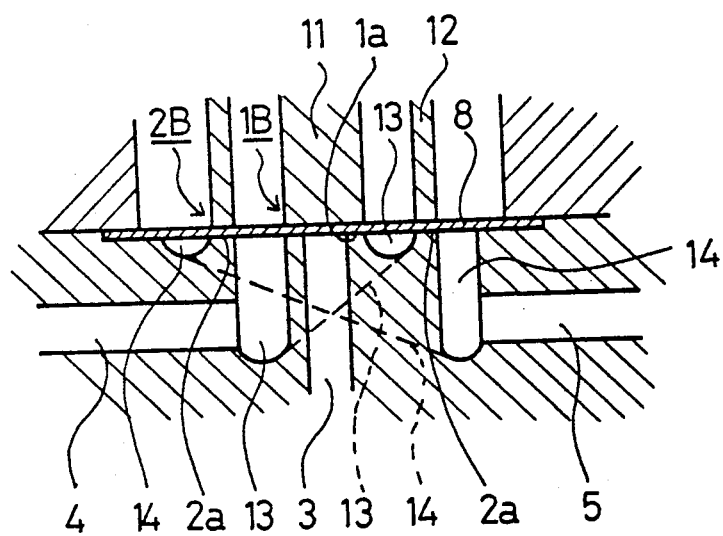
FIG. 5 is a sectional view of a three-way valve according to still another embodiment of the invention.

In FIG. 5, ports 4 and 5 are formed in the valve body 6 to extend in a direction perpendicular to the port 3. The bottoms of the annular spaces 13 and 14 are obliquely formed to connect to the ports 4 and 5, respectively.

Figure 6:
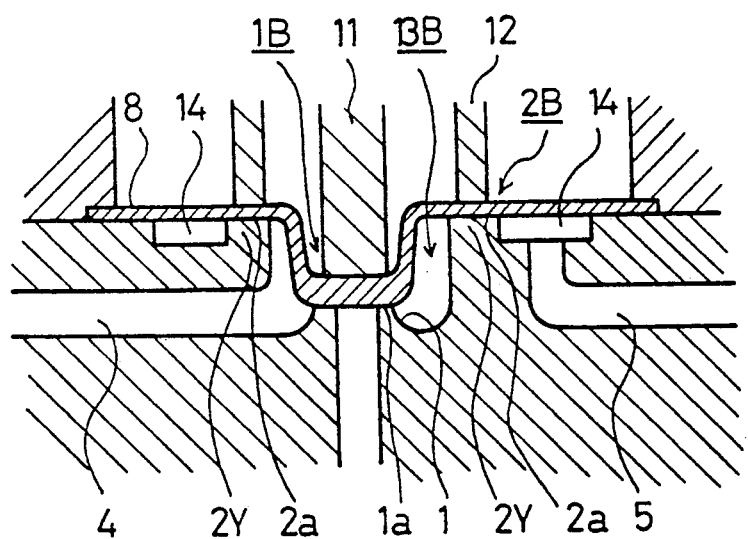
FIG. 6 is a sectional view of a three-way valve according to yet another embodiment of the invention.

In FIG. 6, the port 4 is formed in a direction perpendicular to the port 3 to connect to the port 3 via the main valve 1B and the common passage 13B. The port 5 is formed in a direction perpendicular to the port 3 to connect to an annular groove 14 outside the auxiliary valve seat 2Y and to the port 4 via the auxiliary valve 2B and the common passage 13B.

Figure 7:
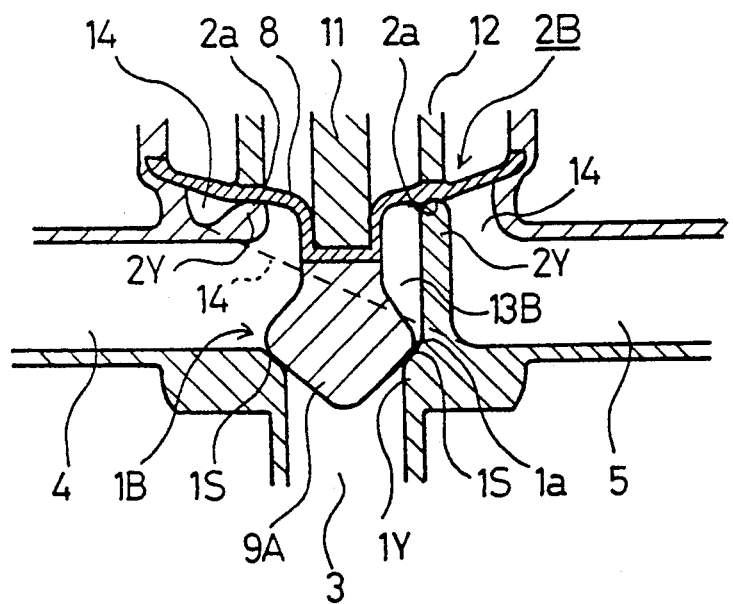
FIG. 7 is a sectional view of a three-way valve according to still another embodiment of the invention.
Figure 8:
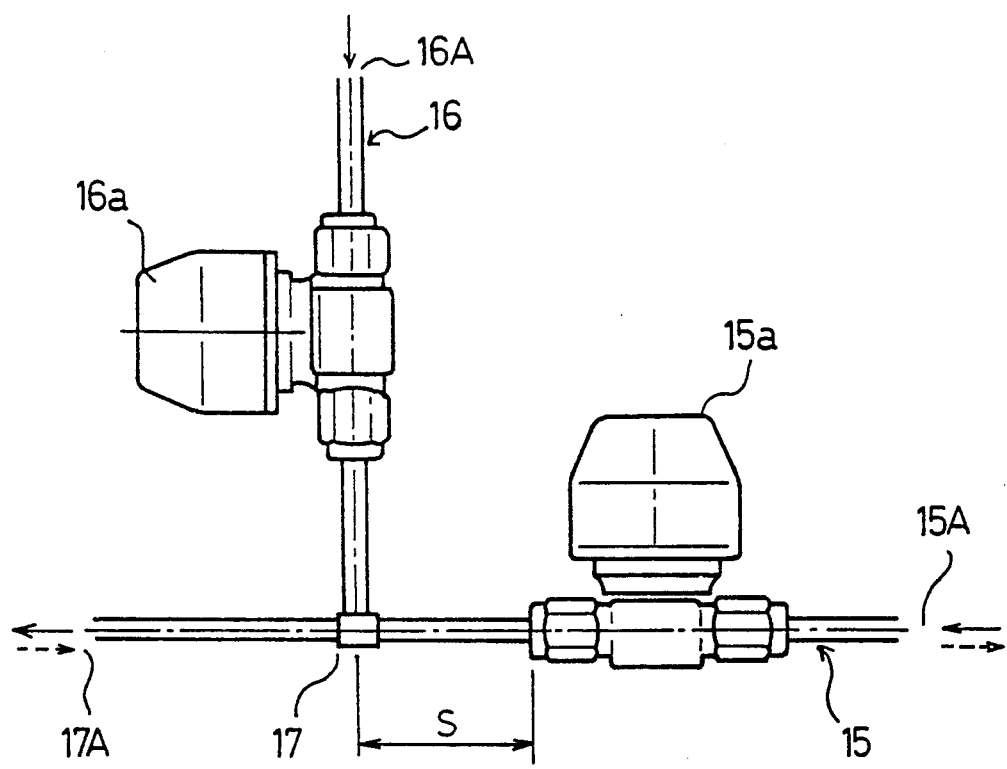
FIG. 8 is a side view of a conventional piping in which two two-way valves are installed.
Figure 9:
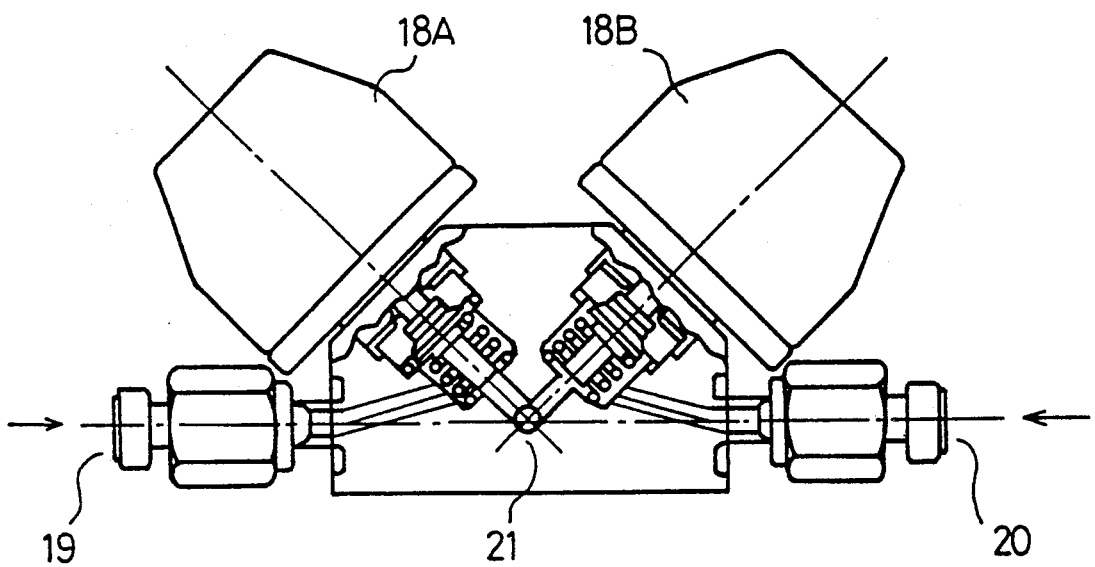
FIG. 9 is a side view of a conventional integrated two-way valves.
Figure 10:
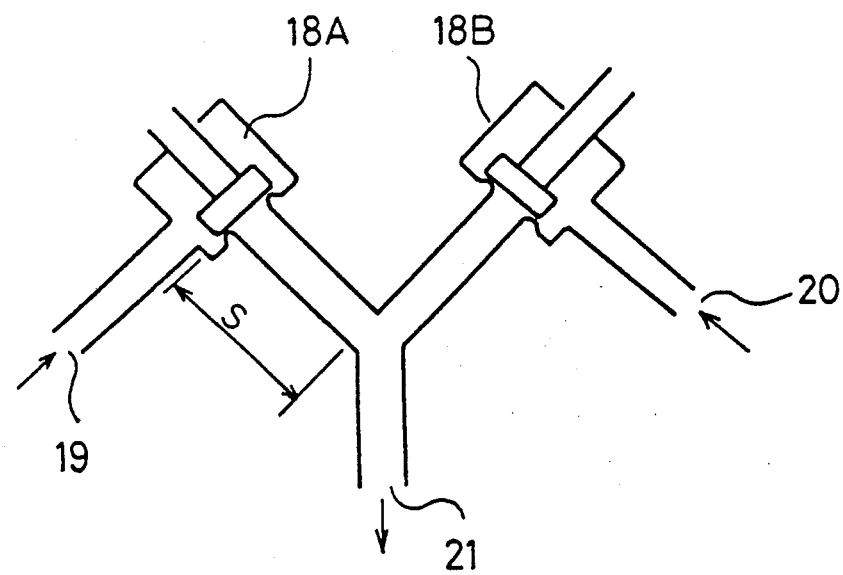
FIG. 10 is a schematic diagram of the integrated two-way valves.
Figure 11:
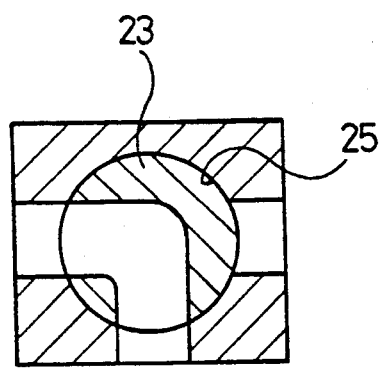
FIG. 11 is a sectional view of a conventional three-way ball valve.
Figure 12:
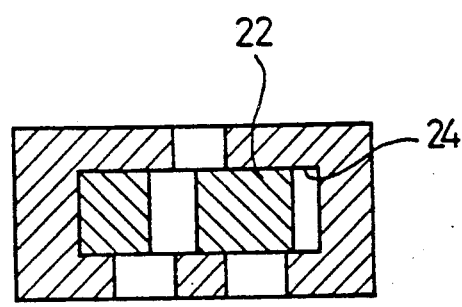
FIG. 12 is a sectional view of a conventional three-way slide valve.

In FIG. 7, the port 3 is provided with a tapered surface 1s to form a main valve seat 1Y. The diaphragm 8 functions as an auxiliary valve plug, and the main valve plug 9A is provided below the diaphragm 8. Alternatively, the annular space 14 may be any passage which communicates with the port 5.

In the arrangements of FIGS. 5-7, the common passages 13, 13B are formed between the contact area of the main valve plug with the main valve seat and a contact area of the auxiliary valve plug with the auxiliary valve seat so that there are no residence spaces. The upper thrust sources may be connected to alternately open and close the main and auxiliary valves 1A and 2A, making the switching operation of a single stage.

As has been described above, according to the invention, the common passage is formed between the contact area of the main valve plug with the main valve seat and the contact area of the auxiliary valve plug with the auxiliary seat so that there are no residence spaces, resulting in the reduced cleaning time and the increased cleanness level.

To test the operation of the three-way valve according to the invention, a test sample A which consists of a clear resin pipe provided with two two-way valves and a test sample B consisting of a three-way valve having a clear resin body were prepared. These test samples were filled with red ink. When one valve of the test sample A was opened, with the other valve closed, to conduct running water, the red ink stayed for a long time in the test sample A between the piping fitting and the closed valve, whereas when the auxiliary valve of the test sample B was opened, with the main valve closed, to conduct running water, the red ink quickly flowed out of the secondary piping including the common passages 13, 13B in the test sample B.

I claim:

1. A three-way valve comprising:
   a hollow bonnet having a cavity therein;
   a valve body having a central port, first and second annular grooves, concentric with said central port, forming a first annular valve seat between said central port and said first annular groove and a second annular valve seat between said first and second annular grooves, a first port formed in said first annular groove, and a second port formed in said second annular groove;
   a sealing diaphragm placed between said hollow bonnet and said valve body so as to separate said first and second annular grooves of said valve body from said cavity of said hollow bonnet;
   a valve shaft provided within said cavity of said hollow bonnet so as to be opposed to said first annular valve seat and movable in the axial direction so that under a thrust, it abuts on said first annular valve seat via said sealing diaphragm to seal a first fluid path between said central port and said first port; and
   a cylindrical valve shaft provided around said valve shaft within said cavity of said hollow bonnet so as to be opposed to said second annular valve seat and movable in the axial direction so that under a thrust, it abuts on said second annular valve seat via said sealing diaphragm to seal a second fluid path between said first and second ports.

2. The three-way valve of claim 1, wherein said first and second annular valve seats have the same height.

3. The three-way valve of claim 1, which further comprises:
   a circular flat valve member secured to said sealing diaphragm so as to directly abut on said first annular valve seat when said valve shaft is thrust; and
   an annular flat valve member secured to said sealing diaphragm so as to directly abut on said second annular valve seat when said cylindrical valve shaft is thrust.

4. The three-way valve of claim 1, wherein said sealing diaphragm is made from an elastic material.

5. The three-way valve of claim 1, wherein said sealing diaphragm is made from a metal foil.

6. The three-way valve of claim 1, wherein said first and second annular valve seats are made from an elastic material.

7. The three-way valve of claim 1, wherein said central port extends in a direction perpendicular to a plane which includes said first and second annular grooves while said first and second ports extend parallel to said plane and in opposite directions to each other.

8. The three-way valve of claim 1, wherein said first annular valve seat is made below said second annular valve seat.

9. The three-way valve of claim 8, which further comprises a valve member secured to said sealing diaphragm and having a conical surface to seal said first fluid path between said central port and said first port.

* * * * *